United States Patent [19]

Takase et al.

[11] Patent Number: 5,079,958
[45] Date of Patent: Jan. 14, 1992

[54] SENSOR HAVING A CANTILEVER

[75] Inventors: Tsugio Takase, Hachioji; Hideo Adachi, Iruma; Takao Okada, Hachioji; Hisanari Shimazu, Akishima; Hideo Tomabechi, Higashiyamato; Hiroshi Kajimura, Tokyo, all of Japan

[73] Assignee: Olympus Optical Co., Ltd., Tokyo, Japan

[21] Appl. No.: 492,811

[22] Filed: Mar. 12, 1990

[30] Foreign Application Priority Data

Mar. 17, 1989 [JP] Japan .................................. 1-65565
Mar. 17, 1989 [JP] Japan .................................. 1-65566

[51] Int. Cl.$^5$ ............................................ G01L 5/00
[52] U.S. Cl. .............................. 73/862.64; 73/150 R; 73/24.03; 73/862.61
[58] Field of Search ............... 73/865.5, 432.1, 580, 73/862.61, 861.73, 117.4, 24.03, 28.01, 28.03, 28.05, 150 r, 862.64

[56] References Cited

U.S. PATENT DOCUMENTS

| | | | |
|---|---|---|---|
| 3,561,253 | 2/1971 | Dorman | 73/24.03 |
| 3,653,253 | 4/1972 | Olin | 73/865.5 X |
| 3,723,778 | 3/1973 | Lu | 73/150 R X |
| 4,157,661 | 6/1979 | Schindel | 73/861.73 |
| 4,638,669 | 1/1987 | Chou | 73/517 R |
| 4,724,318 | 2/1988 | Binnig | 250/306 |
| 4,851,671 | 7/1989 | Pohl | |

FOREIGN PATENT DOCUMENTS

0290647A1 11/1988 European Pat. Off. .
3412724 10/1985 Fed. Rep. of Germany .... 73/150 R

OTHER PUBLICATIONS

"Calculation of the Bloch wall contrast in magnetic force microscopy", U. Hartman et al., Journal of Microscopy, vol. 152, Pt. 1, Oct. 1988, pp. 281-288.

"Tunneling Accelerometer" by A. A. Baski et al., Department of Applied Physics, Stanford University, Jul. 1988.

*Primary Examiner*—Charles A. Ruehl
*Attorney, Agent, or Firm*—Frishauf, Holtz, Goodman & Woodward

[57] ABSTRACT

A sensor comprises a tiny cantilever of a thin film having a detection region at its free end portion, a detector for detecting a displacement of the cantilever caused by material acting on the detecting region, and calculation unit for calculating an amount of the material acting on the detection region, based on the displacement of the cantilever which has been detected by the detector, thereby to measure the intensity of a particle-stream applied to the detection region or the thickness of a film formed on the detection region.

16 Claims, 4 Drawing Sheets

SENSOR HAVING A CANTILEVER

BACKGROUND OF THE INVENTION

1. Field of the Invention

The present invention relates to a sensor having a cantilever. More particularly, it relates to a sensor which is designed for use in a device for measuring the thickness of a thin film being formed by a PVD method or a CVD method, or in a vacuum gauge for detecting the intensities of molecular beams being applied to an object, and in which a minute displacement of a cantilever is detected in the form of changes in the tunnel current supplied to the probe of an STM or that of an AFM, or in the form of changes in an atomic force.

2. Description of the Related Art

In the case of the film thickness measuring device, multiple reflection interference, crystal oscillator and the other manners are usually employed as the method for measuring the thickness of a thin film.

According to the multiple reflection interference manner, the film thickness measuring plate, the half of the surface of which has been masked, is arranged adjacent to a sample and thin film forming and not forming areas are formed adjacent to each other on the plate at the time when a thin film is to be formed on the surface of the sample. A metal film having a high reflection rate is uniformly formed all over the plate and a semitransparent film is placed on the plate at an angle of 8. When homogeneous light having wave-length λ is radiated onto the plate in such a way that it is substantially perpendicular to the surface of the plate, linear interference fringes which are shifted from each other at the stepped portion on the surface of the plate by distance (b) are created parallel to each other with interval (b) interposed between them. Therefore, film thickness (d) can be obtained as follows: $d = (\lambda/2) \cdot (b/a)$. In this case, however, the measurement of film thickness is possible only after the thin film is formed on the plate. Therefore, film thickness cannot be measured while forming the thin film on the plate. In addition, it is needed that the thin metal film having high reflection rate is formed on the plate and this makes the measurement for film thickness quite troublesome. When film thickness is smaller than 20-30 Å, measurement error becomes quite large, thereby making it impossible to carry out the practical measurement of film thickness.

In the case of the film thickness measurement according to the crystal oscillator manner, the crystal oscillator plate is located adjacent to a sample when a thin film is to be formed on the sample. Film thickness can be obtained by measuring the eigenfrequency of the oscillator plate which changes depending upon the thickness of the film formed on the oscillator plate. However, the temperature of the crystal oscillator plate rises while the thin film is being formed and this causes the frequency of electrical oscillation to be shifted, with the result of making measurement accuracy low.

Molecular beam flux radiated on the processed surface of the sample to form a thin film is not uniform in its strength distribution but its strength is gauss-distributed along the direction passing through the center of molecular beam flux. The strength of molecular beam is high in the center of beam-radiated area but low at the periphery of the area. The developing speed of the thin film becomes therefore slightly different at various parts on the processed surface of the sample and this makes it important to previously know the strength distribution of molecular beam flux radiated on the processed surface of the sample.

The strength distribution of molecular beam is obtained from the regional strengths of the beam which are measured at predetermined areas in a plane perpendicular to the beam flux and including the axis of the beam flux. The regional strengths are measured by regional vacuum gages and they are obtained from momentums of molecular beam measured at predetermined areas on the processed surface of the sample by ion gages. The surface ionization gage and detector of the electrons collision type are usually used as the ion gage. The surface ionization gage and electrons collision type detector have openings only in the direction of incident molecular beam, ionize gas molecules passed through the openings and measure the momentum of molecular beam from the equilibrium pressure of gas in the detector obtained by measuring ionization current flowing while gas molecules are being ionized. In the case of the surface ionization gage and electrons collision type detector, however, it is needed for the detection of ion current that the opening through which molecular beam enters has a diameter of at least 10 mm. This makes the resolution, at which the detector can detect the strength distribution, quite low. It is therefore difficult to measure the strength distribution of molecular beam in the space. Further, the pressure of molecular beam measured by the ion gage is likely to be influenced by remaining gas except the molecular beam.

SUMMARY OF THE INVENTION

An object of the present invention is to provide a device capable of measuring the thickness of a thin film while the film is being formed and also capable of measuring the thickness of a quite thin film with high accuracy.

Another object of the present invention is to provide a regional vacuum gage higher in resolution and pressure sensitivity and smaller in size.

According to the present invention, there is provided a sensor having a cantilever, comprising a tiny cantilever made of a thin film, and fixed at one end, and having a free end portion, a detection region located on the free end portion of said cantilever, displacement-detecting means for detecting a displacement of said cantilever from material acting on said detection region, and calculation means for calculating an amount of the material acting on said detection region, based on the displacement of said cantilever which has been detected by said displacement-detecting means, thereby to measure the intensity of a particle-stream applied to said detection region or the thickness of a thin film formed on said detection member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
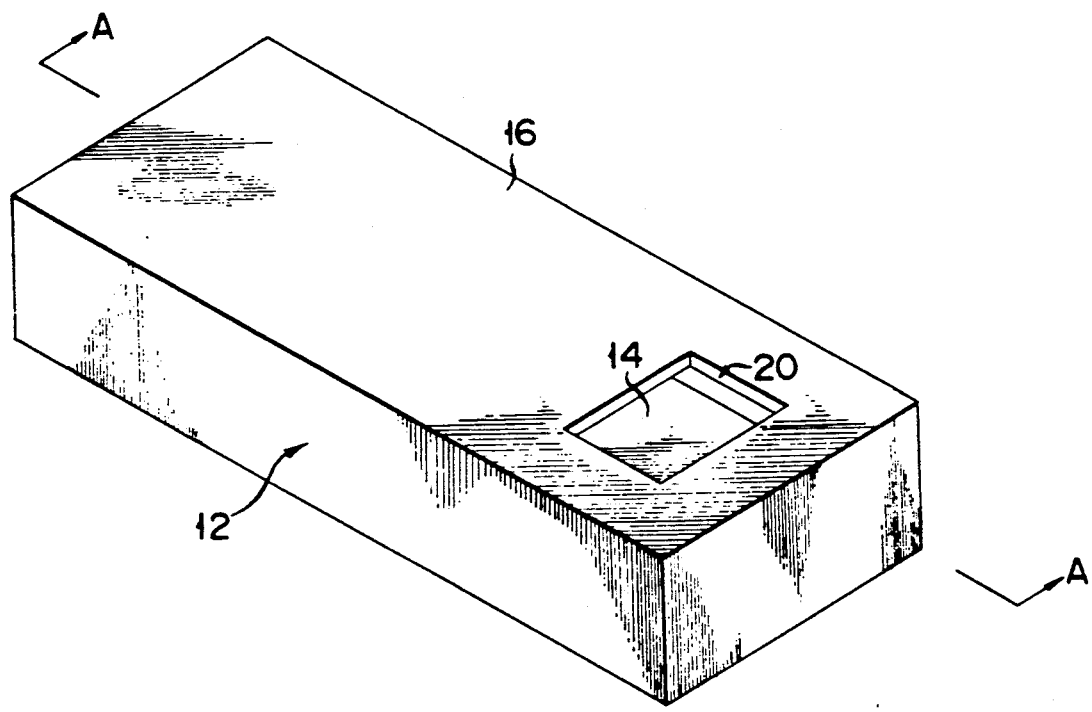
FIG. 1 is a perspective view showing an embodiment of the film thickness measuring device with a sensor having a cantilever, according to the present invention.
Figure 2:
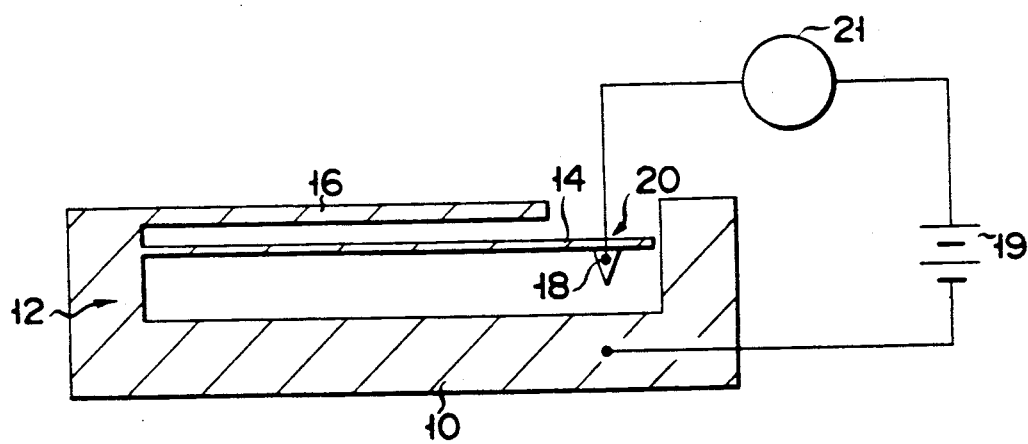
FIG. 2 is a schematic sectional view of the device, explaining the basic operation of the device.

An embodiment of the film thickness measuring device using the sensor of the present invention will be described referring to FIGS. 1, 2 and 2A.

The film thickness measuring device includes base 10, housing 12 having four side walls enclosing base 10, cantilever 14 horizontally supported by piezoelectric member 11 attached to base 10, and top 16 having opening 20 which defines that area of cantilever 14 on which a thin film is formed. More specifically, the film thickness measuring device is a hollow box containing cantilever 14 extending horizontally and having opening 20 located above the free end portion of cantilever 14. Cantilever 14 is an elongated thin rectangular piece having probe 18 projected downward from the underside of its free end. This probe 18 is located such that its tip is set apart from the top of base 10 by a few angstroms. Base 10 is electrically insulated from probe 18 by, for example, making cantilever 14 of insulating material or by interposing an insulator (not shown) between cantilever 14 and probe 18, between piezoelectric member 11 and cantilever 14, or between piezoelectric member 11 and base 10. Base 10 and probe 18 are connected to power source 19 which applies bias voltage of a few volts between them. Tunnel current detector 21 is located in the power source line to detect tunnel current flowing between base 10 and probe 18. Detector 21 comprises two resistors connected in series between probe 18 and power source 19, and amplifier 17 is connected to the node of the resistors. Calculator 15 calculates a thickness of the thin film from the displacement of cantilever 14, which has been detected by detector 21.

This film thickness measuring device is located adjacent to a sample in such a way that the top of cantilever 14 is on a level with the processed surface of the sample at the time when a thin film is to be formed on the sample. Therefore, the thin film material which has passed through opening 20 of the device is deposited on the top of the free end portion of cantilever 14, so that a thin film having same thickness as that of the film formed on the processed surface of the sample can be formed at the predetermined area on the top of the free end portion of cantilever 14. Cantilever 14 is curved downward by the weight of the film deposited on the top of its free end, thereby causing probe 18 to be neared to base 10. As the result, the value of tunnel current flowing between probe 18 and bottom base 10 increases.

Tunnel current detector 21 detects this increase of the tunnel current and outputs a signal representing this increase. The signal is input to an operation circuit (not shown), which calculates the displacement of cantilever 14 from the input signal. From the displacement, thus calculated, there is measured the thickness of the film formed on the predetermined area on the free end portion of cantilever 14, that is, on the processed surface of the sample.

Figure 2A:
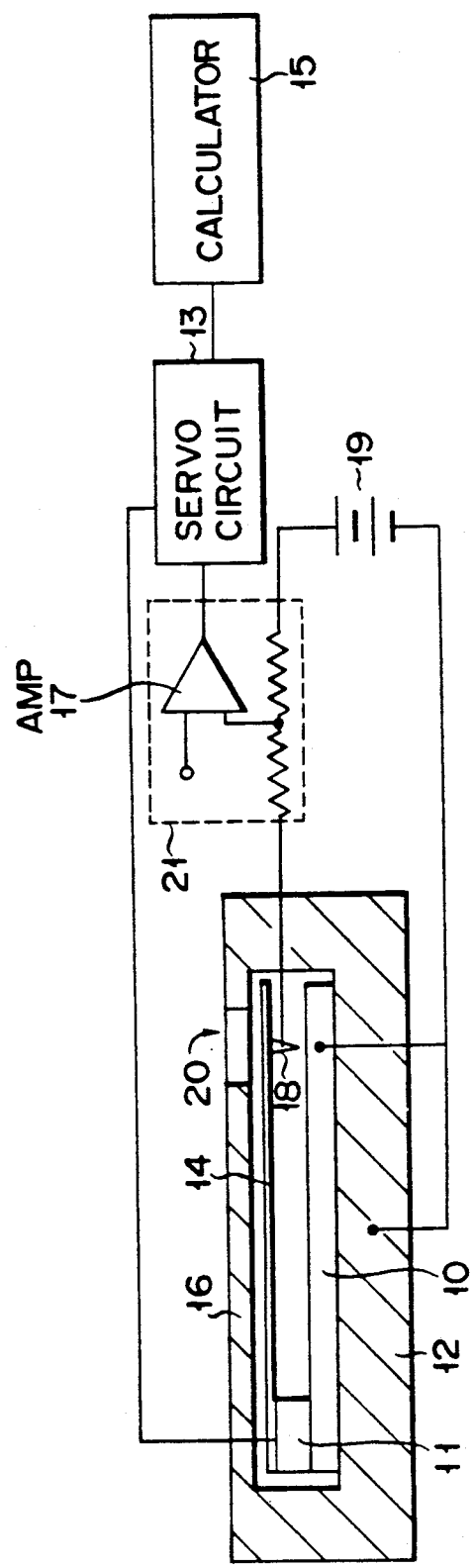
FIG. 2A is a sectional view taken along a line A - A in FIG. 1.

More specifically, as is shown in FIG. 2A, tunnel current detector 21 supplies servo circuit 13 with a signal representing the increase in the tunnel current which has resulted from the deposition of the film on the processed surface of the sample and has been actually detected. Servo circuit 13 feeds the signal back to piezoelectric member 11, thus expanding member 11, such that cantilever 14 is moved away from base 10 and set apart therefrom by the predetermined distance. This servo system is similar to that employed in most STMs. Since the distance between base 10 and probe 18 is maintained constant, the tunnel current can be repeatedly detected with high efficiency. The weight of the film deposited on the processed surface of the sample is computed from the integrated changes in the tunnel current.

Displacement w of cantilever 14 can be determined as follows: $w = pl^3/3EI$ wherein the Young's modulus of cantilever 14 is represented by E, the sectional secondary moment of cantilever 14 by I, load applied to the free end of cantilever 14 by p and the length of cantilever 14 by l. Providing that the width of cantilever 14 is denoted by b and the thickness thereof by h, $I = bh^3/12$. Therefore, $w = (4/E) \cdot (l/h)^3 \cdot (p/b)$. In a case where cantilever 14 is made of Al, having a thickness (h) of 1 μm, width (b) of 0.1 mm and length (l) of 0.5 mm, and chromium having a density of 7.20($g/cm^3$) and gravity acceleration of 9.8($m/sec^2$) is vapor-deposited on cantilever 14 to have a thickness of 10 Å after passing through opening 20, 0.1 mm wide and 0.1 mm long, cantilever 14 is curved or displaced downward only by 0.5 Å because the Young's modulus of Al equals to $7.03 \times 10^{10} (N/m)$. As the result, the value of tunnel current flowing between base 10 and probe 18 changes from 1nA to 3nA. Because it changes depending upon the distance of probe 18 relative to the top of base 10, the load of chromium vapor-deposited on cantilever 14 can be calculated from it. It is naturally supposed that chromium is uniformly vapor-deposited on cantilever 14 at a size of opening 20. Therefore, the thickness of the film can be obtained from the load of chromium deposited.

Figure 5:
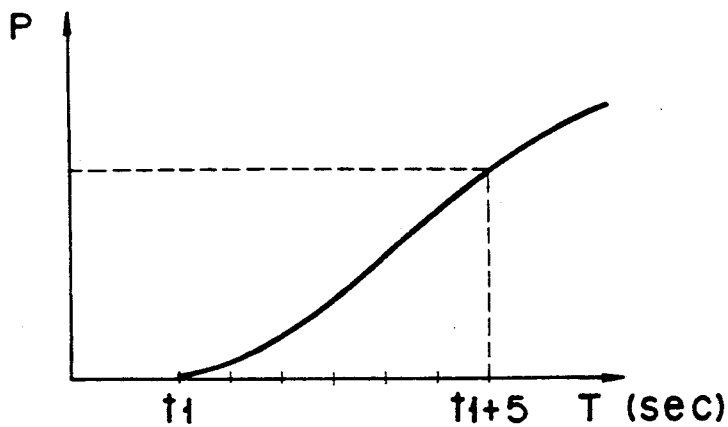
FIG. 5 is a graph showing the relationship between the thickness of a film and the time for forming the film.

According to the film thickness measuring device having the sensor of the present invention, the thickness of the film which is being formed can be measured by detecting tunnel current. More specifically, as is shown in FIG. 5, it can be monitored, in real time, how the film grows thicker as the feed gas is supplied into the box through opening 20, the gas-feeding having started at time $t_1$ when the shutter is opened. In addition, its measuring accuracy is quite high because the thickness of the film is measured by detecting tunnel current flowing between bottom base 10 and probe 18. This enables the thickness of quite thin film to be controlled to the order of atom or molecule. Further, the film thickness measuring device can be made quite small in size. This enables a plurality of the film thickness measuring devices to be arranged around the sample to observe the thickness of the film, which is being formed on the sample, all over it.

Figure 3:
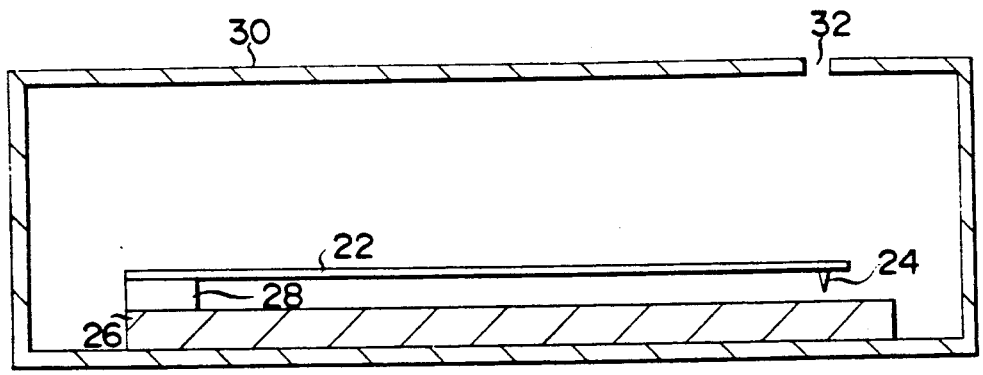
FIG. 3 is a schematic sectional view showing the arrangement of another embodiment of the local vacuum gage according to the present invention.

Another example of the vacuum gage which has the sensor according to the present invention will be described referring to FIG. 3. Cantilever 22 is a foil of $SiO_2$, 0.5 mm long, 0.1 mm wide and 1 μm thick. The Young's modulus of $SiO_2$ is $5 \times 10^{10} N/m^2$ and spring constant k of cantilever 22 can be therefore expressed as follows:

$$k = (h/l)^3/4 \times W \cdot E = 1 \times 10^{-2} n/m$$

Conical probe 24 having a diameter of 10 μm and length of 10 μm is projected from the underside of the free end of cantilever 22. The foremost end of probe 24 is made so sharp, having a curvature radius of about 1 nm, as to act on the top of base 26 by its part which corresponds to a unit of, for example, platinum atom. The other end of cantilever 22 is fixed to the top of piezo-actuator 28 which is mounted on base 26 made of Si. Cantilever 22 is thus held parallel to the top of Si base 26, with a predetermined distance interposed between them. Piezo-actuator 28 has plural electrodes (not shown) and its height changes depending upon voltages applied to these electrodes. When voltage applied to the electrodes is adjusted, therefore, the distance between probe 24 and base 26 can be optionally changed. The combination of base 26, piezo-actuator 28 and cantilever 22 is housed in box 30, which is provided with opening 32 located above the free end portion of cantilever 22 and having a size of 10 μm × 10 μm. Only those molecular beams which have moving components substantially perpendicular to the top of cantilever 22 are therefore radiated onto the predetermined area on the top of the free end portion of cantilever 22.

Predetermined bias voltage is applied from the power source (not shown) to between probe 24 and Si base 26 in a vacuum of about $10^{-9}$-$10^{-10}$ mmHg. Voltage applied to the electrodes of piezo-actuator 28 is adjusted to make the distance between probe 24 and Si base 26 so long as to allow tunnel current of about 0.1-0.2nA to flow between probe 24 and Si base 26.

When molecular beams having a pressure of about $1 \times 10^{-4}$ mmHg, for example, are radiated to the local or regional vacuum gage, they are shielded by the wall of box 30 but only those which have moving components substantially perpendicular to cantilever 22 are allowed to pass through opening 32 of box 30 to form on the processed surface of cantilever 22 a rectangular molecular beam whose size is 10 μm × 10 μm. This rectangular beam is radiated onto the area of 10 μm × 10 μm round the position of the probe on the top of the free end of cantilever 22. Force of about $1 \times 10^{-12} N$ is applied at this time to cantilever 22 because the molecular beam collides with cantilever 22. The spring constant of cantilever 22 is $1 \times 10^{-2} N$ and the free end of cantilever 22 is thus curved or displaced downward only by 1 Å. In short, probe 24 nears to Si base 26 by 1 Å. As the result, the value of tunnel current flowing between probe 24 and Si base 26 changes about 2nA. When this change of tunnel current is detected, the force applied to the free end portion of cantilever 22 by the collision of the molecular beam with cantilever 22 can be obtained, so that the strength of the molecular beam can be measured.

Figure 4:
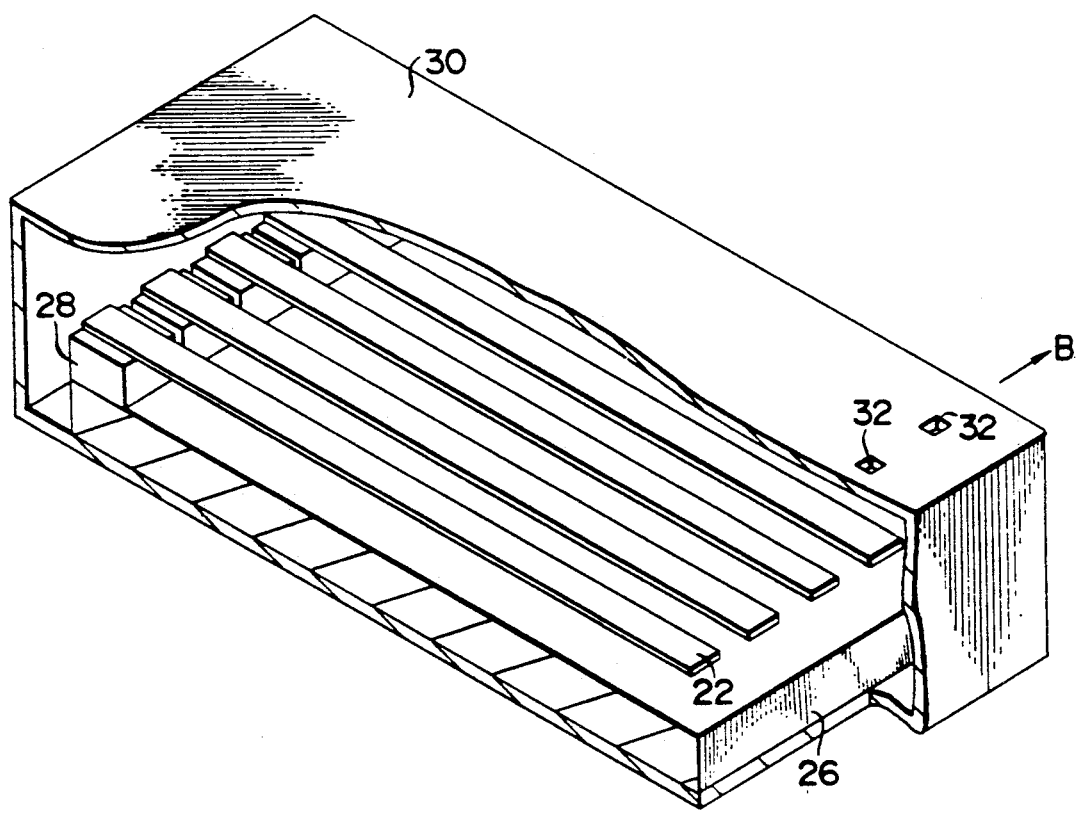
FIG. 4 is a partially broken perspective view showing a device having plural local vacuum gages shown in FIG. 3, said plural local vacuum gages being arranged side by side at a pitch of 0.2 mm.

FIG. 4 shows the above-described regional vacuum gages arranged side by side at a pitch of 0.2 mm. Box 30 has plural openings 32 arranged in direction (B) at the pitch of 0.2 mm and located at those positions which correspond to the free end portions of cantilevers 22 housed in box 30. As described above, each of the rectangular molecular beams which have been shaped by openings 32 of box 30 is radiated onto each of the free end portions of cantilevers 22. The value of tunnel current is thus changed depending upon the displacement of each of the free end portions of cantilevers 22, so that the strength of the molecular beam can be measured from this change of tunnel current about each of the regional vaccum gages arranged side by side at the pitch of 0.2 mm. In short, it can be made clear at the pitch of 0.2 mm how the strengths of the molecular beams are distributed on the thin film formed on the processed surface of the sample. The distribution of strengths of the molecular beams is obtained in one direction on a plane perpendicular to the direction in which the molecular beams are radiated, but this measurement in one direction is sufficient because the distribution of strengths of the molecular beams is of gauss relative to the direction which passes through the center of molecular beams flux. Needless to say, a more accurate distribution of strengths of the molecular beams can be obtained if measurement is carried out in two directions on the plane.

According to the above-described arrangement of regional vacuum gages, strengths of plural molecular beams can be measured at the interval of 0.2 mm. Therefore, the distribution of strengths of the molecular beams can be obtained at a resolution of 0.2 mm.

Although the spring constant of cantilever 22 has been $1 \times 10^{-2} N/m$ in the case of the above-described regional vacuum gage, the range of molecular beam strengths measured can be changed when the spring constant of the cantilever, i.e. the shape of the cantilever and the material of which the cantilever is made are changed. Further, the resolution for the distribution of strengths of molecular beams measured is determined by the pitch at which the cantilevers are arranged side by side. When the width of each of the cantilevers is made smaller and the pitch at which the cantilevers are arranged side by side is smaller, therefore, the resolution for the distribution of strengths of molecular beams can be enhanced.

The thickness-measuring device and the regional vacuum gauge, both described above, are designed to measure the thickness of a thin film being formed, from the displacement of a cantilever which takes place as the feed gas or a molecular beam is applied to the free end portion of the cantilever through an opening and which is calculated from the tunnel current of an STM. Nevertheless, according to the present invention, the displacement of the cantilever can be computed from values other than the tunnel current.

Figure 6:
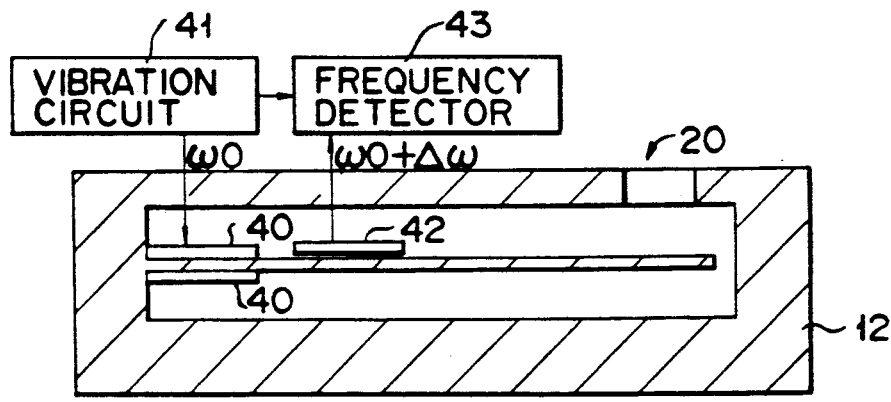
FIG. 6 shows another embodiment of the invention having an AFM for detecting a displacement of the cantilever.

FIG. 6 illustrates another embodiment of the invention, which is designed for use in an AFM (Atomic Force Microscope) and which detects the distance between a cantilever and a probe. As is shown in FIG. 6, cantilever 14 is vibrated at its characteristic frequency $\omega 0$ by bimorph piezoelectric members 40, which in turn is driven by vibration circuit 41. Capacitance sensor 42, which is an electrode, extends parallel to cantilever 14. This sensor 42 detects that the frequency $\omega 0$ increases to $\omega 0+\Delta\omega$, due to not only the increase in the weight of the film being formed on cantilever 14 but also the force of the molecular beams applied to cantilever 14. Sensor 42 and supplies frequency detector 43 with a signal representing $\omega 0+\Delta\omega$. Circuit 43 detects the value $\Delta\omega$ (i.e., the increase of the characteristic frequency of cantilever 14) by comparing the characteristic frequency and the increased frequency. From this value $\Delta\omega$, the amount of deposition on the cantilever 14 is determined. Since the changes, as well as the weight of the film, greatly influence the frequency at which cantilever 14 vibrates, the probe (not shown in FIG. 6) can perform its function with high efficiency.

Changes in the frequency of cantilever 14 can be determined by the reverse electromotive force of the bimorph piezoelectric members 40.

Moreover, by vapor-depositing Ni on the AFM probe in the embodiment shown in FIG. 6, it is possible to detect changes in the magnetic force (i.e., attraction) between the probe and the cantilever, by virtue of the principle of a magnetic force microscope.

Figure 7:
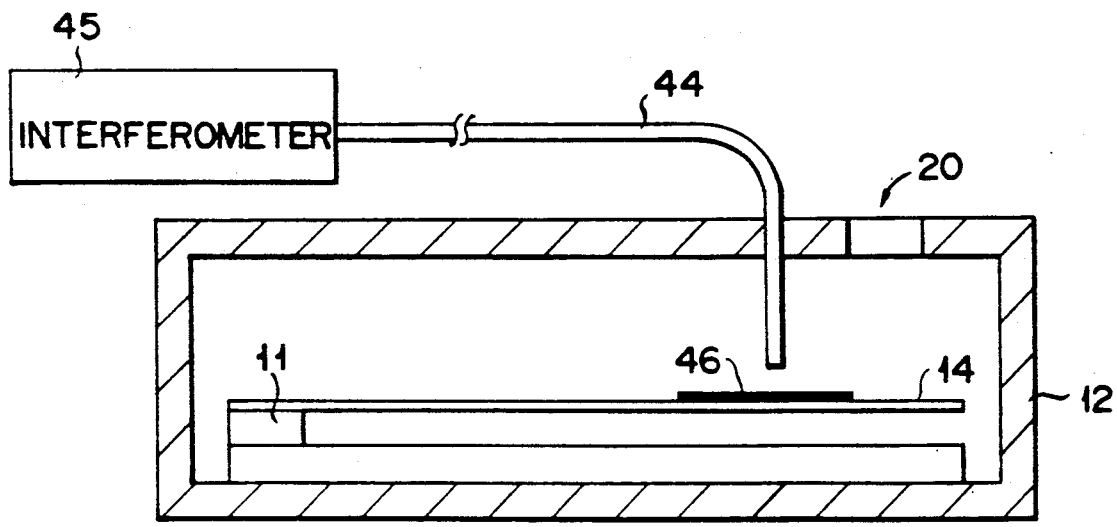
FIG. 7 shows still another embodiment of the invention having an AFM for detecting a displacement of the cantilever.

FIG. 7 illustrates still another embodiment which is designed to detect the displacement of cantilever 14 used in an AFM and which comprises optical fiber 44 and interferometer 45. This embodiments requires no components for detecting an atomic force between cantilever 14 and the probe (not shown). Interferometer 45 emits a laser beam, which is applied through optical fiber 44 to reflector layer 46 formed on the free end portion of cantilever 14. The laser beam reflected from layer 46 is applied back to interferometer 45 through optical fiber 44. Interferometer 45 detects changes in the length of the laser beam path, which is proportional to the displacement of cantilever 14. Piezoelectric member 11 connects cantilever 14 to the base and is driven to compensate for the displacement of cantilever 14.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A sensor comprising:
   a tiny cantilever sized at the micron level made of a thin film, and fixed at one end, and having a free end portion;
   a detection region located on the free end portion of said cantilever;
   displacement-detecting means for detecting a displacement of said cantilever due to material acting directly on said detection region; and
   calculation means for calculating an amount of the material acting on said detection region, based on the displacement of said cantilever which has been detected by said displacement-detecting means, thereby to measure the intensity of a particle-stream applied directly to said detection region or the thickness of a thin film formed on said detection region.

2. The sensor according to claim 1, wherein said displacement-detecting means comprises an electrically conductive probe attached to the free end portion of said cantilever facing a conductive reference member, and is designed to detect the displacement of said cantilever from changes in a tunnel current generated when a bias voltage is applied between the probe and the reference member.

3. The sensor according to claim 1, wherein said displacement-detecting means has cantilever-driving means for vibrating said cantilever at a characteristic frequency specific to said cantilever, and frequency-detecting means for detecting changes in the frequency at which said cantilever is vibrated, which have resulting from the material acting on said cantilever, whereby the displacement of said cantilever is determined from the changes in the frequency.

4. The sensor according to claim 1, wherein said displacement-detecting means comprises a probe attached to the free end portion of said cantilever, servo control means for bending said cantilever in such a direction as to compensate for changes in a physical quantity which occurs between the probe and a reference member facing the probe, and servo amount-detecting means for detecting a servo amount which the servo control means has applied to the probe.

5. The sensor according to claim 4, wherein said physical quantity is a tunnel current flowing between said probe and said reference member.

6. The sensor according to claim 4, wherein said physical quantity is an atomic force generated between said probe and said reference member.

7. The sensor according to claim 1, wherein said detection region is defined by an opening made in a wall of a housing containing said cantilever and located above the free end portion of said cantilever.

8. The sensor according to claim 1, wherein said one end of said cantilever is held by a piezoelectric member.

9. A sensor comprising:
   a plurality of tiny cantilevers made of a thin film, and fixed at one end, and having a free end;
   a plurality of detection regions formed, respectively, on those portions of said cantilevers which are located close to the free end portions of said cantilevers;
   displacement-detecting means for detecting a displacement of each of said cantilevers from material acting on the detection region formed on the cantilever; and
   calculation means for calculating an amount of the material acting on said detection regions, based on the displacements of said cantilevers which have been detected by said displacement-detecting means, thereby to measure the intensities of particle-streams applied to said detection regions or the thicknesses of thin films formed on said detection regions.

10. The sensor according to claim 9, wherein said detection regions are defined by openings made in that wall of a housing containing said cantilevers, which opposes the free end portions of said cantilevers.

11. The sensor according to claim 9, wherein said cantilevers extend parallel to one another, said one end of each cantilever is held by a piezoelectric member, and the free ends of said cantilevers are aligned at the same level.

12. A sensor comprising:
   at least one tiny cantilever sized at the micron level made of a thin film, and fixed at one end, and having a free end portion;
   a detection region located on the free end portion of said at least one cantilever;
   displacement-detecting means for detecting a displacement of said at least one cantilever due to material acting directly on said detection region; and calculation means for calculating an amount of the material acting on said detection region, based on the displacement of said at least one cantilever which has been detected by said displacement-detecting means, thereby to measure the intensity of a particle-stream applied to said detection region or the thickness of a thin film formed on said detection region.

13. The sensor according to claim 12, wherein said detection region is defined by an opening made in that wall of a housing containing said at least one cantilever, which opposes the free end portion of said at least one cantilever.

14. The sensor according to claim 12, wherein a plurality of cantilevers are provided which extend parallel to one another, said one end of each cantilever is held by a piezoelectric member, and the free ends of said cantilevers are aligned at the same level.

15. A sensor for measuring the thickness of a film deposited on a flat surface of a sample place adjacent said sensor, comprising:

a cantilever made of a thin film fixed at one end, and having a free end portion;

a detection region located on the free end portion of said cantilever and having a surface substantially parallel to the flat surface of said sample;

displacement detecting means for detecting a displacement of said cantilever due to a film formed on the surface of said detection region simultaneously with a film forming on said sample surface; and means responsive to the detected displacement of said cantilever for determining an amount of the material forming said film deposited on said detection region to thereby measure the thickness of the film formed on said detection region and said sample surface.

16. A sensor for measuring the intensity of a particle stream flowing in a given direction, comprising:

a cantilever made of a thin film fixed at one end, and having a free end portion;

a detection region located on the free end portion of said cantilever and having a flat surface substantially perpendicular to said given direction;

displacement detecting means for detecting a displacement of said cantilever along said given direction due to application of said particle stream to the surface of said detection region; and means responsive to the detected displacement of said cantilever for determining an amount of the material in said particle stream acting on the surface of said detection region to thereby measure the intensity of said particle stream.

* * * * *